United States Patent Office 3,810,897
Patented May 14, 1974

3,810,897
N-SUBSTITUTED - N-ALKANOL PIPERAZINE CARBAMATES AND ACID ADDITION SALTS THEREOF
Jean B. Philippe, Clermont-Ferrand, France, assignor to Ferlux, Clermont-Ferrand, France
No Drawing. Filed Oct. 12, 1971, Ser. No. 188,583
Claims priority, application France, Oct. 16, 1970, 7037396
Int. Cl. C07d 51/70
U.S. Cl. 260—268 FT
2 Claims

ABSTRACT OF THE DISCLOSURE

N-substituted-N'-alkanol piperazine carbamates of the General Formula I

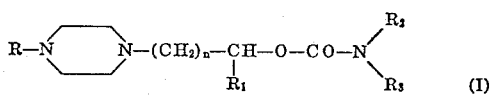

wherein R, $R_1$, $R_2$, $R_3$ and $n$ are as defined in the specification, the acid addition salts of these carbamates, a method of manufacturing same from an alcohol of the General Formula II

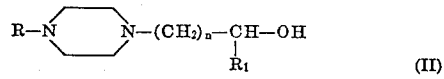

and therapeutic compositions containing the carbamates and salts thereof, having neuroleptic, tranquilizing and central analgesic properties.

---

This invention relates to 1,4-disubstituted piperazine derivatives which are non-symmetrical, and more particularly to N-substituted-N'-alkanol-piperazine carbamates, the acid addition salts thereof, and to a method of manufacturing same. The invention also provides pharmaceutical preparations containing the said carbamates and salts thereof.

The derivatives of the invention have the General Formula I:

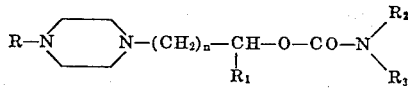

in which
(1) R is selected from:
(a) aryloxyalkyl groups:

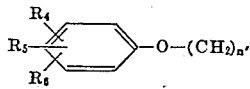

where $R_4$, $R_5$, $R_6$ are each independently selected from hydrogen atoms, halogen atoms, nitro groups, lower alkyl groups, lower alkoxy groups, and acetyl, propionyl and oxo-alkyl groups, and $n'$ represents 2 or 3;
(b) α- and β-naphthyloxyalkyl groups of the formulae

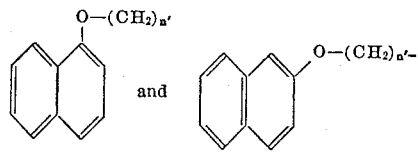

$n'$ being 2 or 3;
(c) aroylalkyl groups of the formula

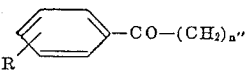

where $R_7$ is selected from hydrogen and halogen atoms and lower alkoxy groups and $n''$ is 2, 3 or 4;

(d) thienoyl alkyl groups of the formula

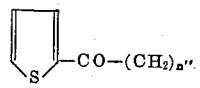

where $n''$ is 2, 3 or 4; and
(e) the dimethyl-amino-ethyl group

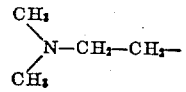

(2) $n$ is 1 or 2;
(3) $R_1$ is selected from a hydrogen atom (with the proviso that $n$ is then 1 or 2) and alkyl and aryl groups, $n$ then being 1 in both cases; and
(4) $R_2$ and $R_3$ are each independently selected from hydrogen atoms, lower alkyl and lower halogenoalkyl groups, phenyl, halogenophenyl, alkoxyphenyl, polyalkoxyphenyl, trifluoromethylphenyl, nitrophenyl, and alkylphenyl groups, benzyl, cyclohexyl and naphthyl groups, cyclic groups containing the adjacent nitrogen atom in their ring, such as pyrrolodine, piperidine, and morpholine, either substituted or unsubstituted, and sulfonamide, benzene-sulfonyl, para-toluenesulfonyl, naphthalene sulfonyl, and xylene sulfonyl groups; provided that
(1) when $R_1$ is a hydrogen atom and R is the radical

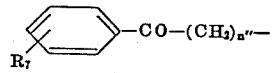

where $R_7$ is as defined with the exclusion of hydrogen, and $n''$ is 3 or 4, then $R_2$ and $R_3$ are not hydrogen or identical lower alkyl groups; and
(2) when R is the radical

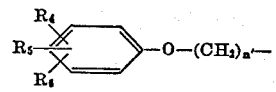

$R_2$ and $R_3$ are not hydrogen atoms, nor identical lower alkyl groups, nor unsubstituted aryl groups, nor aryl groups substituted by an alkoxy, alkyl or halogenoalkyl group.

The present invention also provides the acid addition salts of the carbamates of General Formula I, with organic or non-toxic mineral acids; these salts are pharmaceutically acceptable and have the additional advantage of being soluble in water.

The present invention further provides pharmaceutical preparations containing one or more of the carbamates and/or their salts as the active ingredient. These pharmaceutical preparations are intended for administration orally rectally, parenterally or locally by means of simple tablets or pills, coated or not with a view to enteric splitting or retardation; capsules, gelatinates, suppositories, ampoules which can be swallowed in water or injected, creams, lotions, and ointments: all these are prepared according to standard practice with the excipients corresponding to the forms chosen.

The carbamates and salts thereof described above are useful compounds from the pharmacological point of view because of the fact that they possess remarkable neuroleptic, tranquilizing and central analgesic properties. To these properties are also added, for certain derivatives, anti-inflammatory, hypertensive, anti-histamine and antipyretic properties.

The carbamates of the present invention are prepared from N-substituted-N'-alkanol-piperazines of the General Formula II:

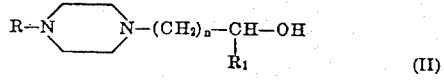

which in turn are prepared according to the techniques described in the two prior French patent applications Nos. 6,918,171 and 6,943,647.

In the case where the group R is the dimethylaminoethyl group and $n$ is equal to 1 and $R_1$ is an atom of hydrogen, this Compound II is obtained according to:

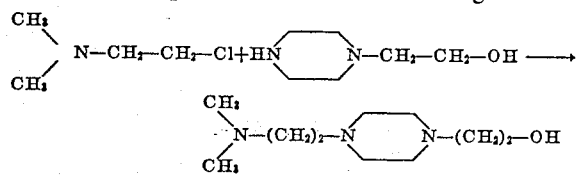

This reaction is carried out in a solvent such as methylcellosolve, at boiling temperature, and in the presence of an alkaline substance, e.g. sodium carbonate.

The carbamates of the present invention are obtained by starting from compounds of the General Formula II in accordance with the following procedures:

(a) When $R_2$ and $R_3$ both represent a hydrogen atom the compounds of the General Formula II are obtained in accordance with the reaction:

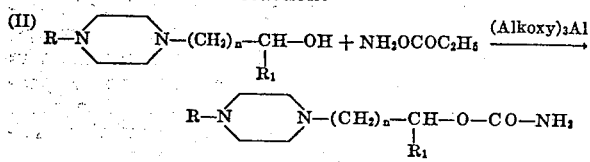

$R$, $n$ and $R_1$ being as defined above.

The transesterification of ethyl carbamate by the hydroxylated compound of General Formula II is preferably carried out in anhydrous toluene in the presence of tri(isopropyloxy)aluminum.

(b) When $R_2$ (or $R_3$) represents a hydrogen atom, and $R_3$ (or $R_2$) a lower alkyl, halogenoalkyl, phenyl, halophenyl, nitrophenyl, alkylphenyl, naphthyl, cyclohexyl, sulfonamide, benzene sulfonyl, para-toluene sulfonyl, naphthalene sulfonyl or xylene sulfonyl group, the carbamates of the General Formula I are obtained in accordance with:

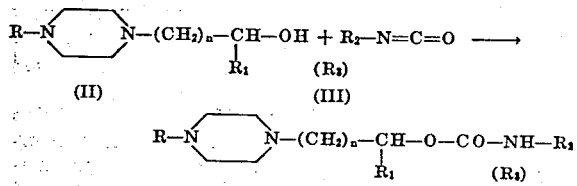

$R$, $n$ and $R_1$ being as defined above.

The reaction is then preferably carried out in an appropriate organic solvent such as benzene, toluene, or xylene in the presence of an alkaline agent such as triethylamine or triethylenediamine. The reaction is preferably carried out at a temperature lying between the ambient temperature and the boiling point of the reaction medium.

The isocyanates of the General Formula III are products known in themselves and can be obtained from the appropriate azides. These latter are transformed by the classic Curtius reaction into isocyanates by heating in benzene or other inert solvent; the isocyanates may be reacted with the alcohol of the General Formula II without there being any necessity to isolate them.

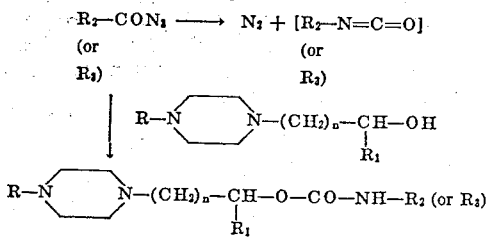

(c) When $R_2$ and $R_3$, identical or not, each are lower alkyl group or phenyl, halogenophenyl, alkylphenyl, alkoxyphenyl, benzyl, cyclohexyl, or naphthyl group, or together form a ring with the adjacent nitrogen atom, such as pyrrolidine, piperidine, or morpholine group, the carbamates of the General Formula I are obtained in accordance with:

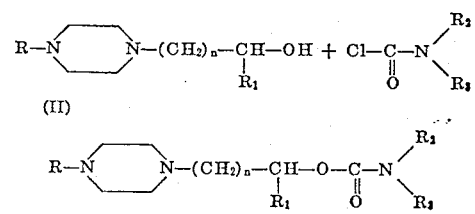

$R$, $R_1$ and $n$ being as defined above.

When $R_2$ and $R_3$ each represent a lower alkyl group it is preferred, bearing in mind the results of the reaction, to operate in a polar solvent such as dioxan in the presence of an alkaline agent capable of combining with the hydrochloric acid formed in the course of the reaction, such an agent being sodium carbonate or triethylamine.

When $R_2$ and $R_3$ are other of the groups indicated above the reaction is preferably carried out in an appropriate solvent such as benzene, toluene or xylene in the presence of an excess of the alcohol of the General Formula II in order to fix the hydrochloric acid liberated in the course of the reaction.

In both cases the reaction is preferably effected at the boiling temperature of the solvent being utilized.

The carbamates thus prepared exist in their free form or may be isolated in the form of salts with the aid of inorganic or organic acids by using standard methods for the preparation of salts.

The following examples are given in order to illustrate the invention in greater detail.

EXAMPLE I

Dimaleate of N-(β-naphthoxy)-2-ethyl-N'(carbamoyloxy-2-ethyl)-piperazine (No. 1)

A mixture of 5.34 g. (0.06 mole) of ethyl carbamate, 12 g. (0.04 mole) of N-(β-naphthoxy)-2-ethyl-N'-(hydroxy-2-ethyl)-piperazine and 30 ml. of toluene was refluxed in a 100 ml. balloon-flask with a 40 cm. filling column fitted with a column head for total reflux. After collecting the toluene-water azeotrope (P.E.=84° C.), the heating was stopped. 1.25 g. (0.006 mole) of tri(isopropyloxy)aluminium was added to the reaction mixture and once again the mixture was refluxed.

The fraction distilling at 76° C. formed by the toluene-ethanol azeotrope (ethanol: 68%) was collected. After heating for 24 hours, when the reaction was considered complete anhydrous acetone was added and the resulting mixture was filtered. After evaporation of the solvent from the filtrate an oily residue was obtained.

This was dissolved in 250 ml. of acetone, with heating. To this solution was added a boiling solution of 11 g. of maleic acid in acetone. The dimaleate separated immediately by precipitation.

By recrystallization from alcohol at 95° a product which was slightly soluble in water was obtained.

By operating under these conditions, the following typical compounds, whose physical characteristics are given in Table I, were obtained.

N - [(β-naphthoxy)-2-ethyl]-N'-(carbamoyloxy-2-ethyl)-piperazine (No. 2).—By transesterification of ethyl carbamate and N - [(β-naphthoxy)-2-ethyl]-N'-(hydroxy-2-ethyl)piperazine. The dimaleate was recrystallized from alcohol at 95°.

N-[(para-propionyl phenoxy)-2-ethyl]-N'-(carbamoyloxy-2-ethyl)-piperazine (No. 3).—By transesterification of ethyl carbamate and N-[(para-propionyl phenoxy)-2-ethyl]-N'-(hydroxy-2-ethyl)-piperazine. The dimaleate was recrystallized twice from alcohol at 95°.

EXAMPLE III

Dihydrochloride of N-[γ-(2-thienoyl)-propyl]-N'-(cyclohexyl carbamoyloxy)-2-ethyl] piperazine (No. 8)

A mixture of 11.28 g. (0.04 mole) of N-[γ-(2-thienoyl)-propyl]-N'-(hydroxy-2-ethyl) piperazine and 15 g. (0.12 mole) of cyclohexyl isocyanate was refluxed in 50 ml. of anhydrous benzene for 5 hours in the presence of 0.77 g. of triethylene diamine.

After cooling, the solution was filtered, and the solvent was evaporated under reduced pressure. A crystalline product was obtained which was converted to the dihydrochloride by the action of gaseous hydrochloric acid. Recrystallization was from a mixture of absolute alcohol and ether.

Operating under these general conditions, the following typical compounds as listed in Table III were obtained.

(a) N-[(para-fluorophenoxy)-2-ethyl]-N'-[(isopropyl carbamoyloxy)-2-ethyl] piperazine (No. 9).—By reaction of N-[(para-fluorophenoxy)-2-ethyl]-N'-(hydroxy-2-ethyl) piperazine with isopropyl isocyanate. The dihydrochloride was recrystallized from a mixture of absolute alcohol and ether.

(b) N-[γ-(fluoro-4-benzoyl)-propyl]-N'-[(ethyl carbamoyloxy)-ethyl] piperazine (No. 10).—By reaction of N-[γ-(fluoro-4-benzoyl)-propyl]-N'-(hydroxy-2-ethyl) piperazine with ethyl isocyanate. The dimaleate was recrystallized from 95° alcohol.

(c) N-[γ-(fluoro-4-benzoyl)-propyl]-N'-[(cyclohexyl carbamoyloxy)-2-ethyl] piperazine (No. 11).—By reaction of N-[γ-(fluoro-4-benzoyl)-propyl]-N'-(hydroxy-2-ethyl) piperazine with cyclohexyl isocyanate. The dihydrochloride was recrystallized from 95° alcohol (No. 11).

(d) N-[γ-(fluoro-4-benzoyl)-propyl]-N'-[(isopropyl carbamoyloxy)-2-ethyl] piperazine (No. 12).— By reaction of N-[γ-(fluoro-4-benzoyl)-propyl]-N'-(hydroxy-2-ethyl) piperazine with isopropyl isocyanate. The dimaleate was recrystallized from 95° alcohol.

TABLE 1

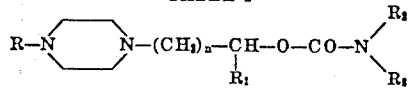

| No. | R | n | $R_1$ | $R_2=R_3$ | Yield, percent | Salt | °F. | Calculated C | Calculated H | Calculated N | Found C | Found H | Found N |
|---|---|---|---|---|---|---|---|---|---|---|---|---|---|
| 2 | (naphthyl)—O—(CH₂)₂ | 1 | H | H | 57 | 2C₄H₄O₄ | 189 | 56.40 | 5.74 | 7.30 | 56.86 | 5.82 | 6.90 |
| 3 | CH₃—CH₂—CO—(phenyl)—O—(CH₂)₂— | 1 | H | H | 40 | 2C₄H₄O₄ | 189 | 53.63 | 6.02 | 7.22 | 53.43 | 6.10 | 6.92 |

EXAMPLE II

Dihydrochloride of N-[γ-(fluoro-4-benzoyl)-propyl]-N'-[phenyl-carbamoyloxy)-2-ethyl]piperazine (No. 4)

A mixture of 17.64 g. (0.06 mole) of N-[γ-fluoro-4-benzoyl)-propyl]-N'-(hydroxy-2-ethyl) piperazine and 7.16 g. (0.06 mole) of phenyl isocyanate was boiled in 70 ml. of anhydrous benzene for 12 hours in the presence of a few drops of triethylamine. After removal of the benzene an oily product (the free base) was obtained.

The product was isolated in the form of its dihydrochloride by dissolving the base in a mixture of acetone and anhydrous ether (1:1) and by bubbling a stream of dry gaseous HCl through the solution. Recrystallization was from alcohol at 95°.

Following this mode of operation, the following products whose physical characteristics are listed in Table II were obtained.

(a) N-[dimethylamino)-2-ethyl]-N'-[(phenylcarbamoyloxy)-2-ethyl] piperazine (No. 5).—By the action of N-[(dimethylamino)-2-ethyl]-N'-(hydroxy-2-ethyl) piperazine and phenyl isocyanate. The trimaleate was recrystallized from 95° alcohol.

(b) N-[γ-fluoro-4-benzoyl)-propyl]-N'-[(methyl carbamoyloxy)-2-ethyl] piperazine (No. 6).—By the action of N-[γ-(fluoro-4-benzoyl)-propyl]-N'-(hydroxy-2-ethyl) piperazine and methyl isocyanate. The dihydrochloride was recrystallized from absolute alcohol.

(c) N-[(phenoxy-2-ethyl)]-N'-[(ethylcarbamoyloxy)-2-ethyl] piperazine (No. 7).—By the action of N-[(phenoxy-2-ethyl)]-N'-(hydroxy-2-ethyl) piperazine and ethyl isocyanate. The dimaleate was recrystallized from 95° alcohol.

TABLE 2

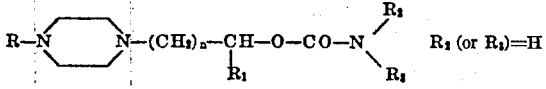

$R_2$ (or $R_3$)=H

| No. | R | n | $R_1$ | $R_2$ or $R_3$ | Salt | °F. | Calculated C | Calculated H | Calculated N | Found C | Found H | Found N |
|---|---|---|---|---|---|---|---|---|---|---|---|---|
| 4 | F—(phenyl)—CO—(CH₂)₃— | 1 | H | (phenyl) | 2HCl | 228 | 56.65 | 6.17 | 7.66 | 56.85 | 6.05 | 7.90 |
| 5 | (CH₃)₂N—(CH₂)₂— | 1 | H | (phenyl) | 3C₄H₄O₄ | 175 | 52.10 | 5.98 | 8.39 | 51.99 | 5.93 | 8.29 |
| 6 | F—(phenyl)—CO—(CH₂)₃— | 1 | H | —CH₃ | 2HCl | 182 | 51.0 | 6.36 | 9.90 | 51.3 | 6.50 | 9.70 |
| 7 | (phenyl)—O—(CH₂)₂— | 1 | H | —C₂H₅ | 2HCl | 167 | 51.80 | 7.36 | 10.66 | 52.06 | 7.20 | 10.82 |

(e) N-[(para-fluorophenoxy) - 2 - ethyl]-N'-[(butyl carbamoyloxy)-2-ethyl] piperazine (No. 13).—By reaction of N-[(para-fluorophenoxy)-2-ethyl]-N'-(hydroxy-2-ethyl) piperazine with butyl isocyanate. The dimaleate was recrystallized from absolute alcohol.

(f) N-[(ortho - nitrophenoxy)-2-ethyl]-N'-[(butyl carbamoyloxy)-2-ethyl] piperazine (No. 14).—By reaction of N-[(ortho-nitrophenoxy) - 2 - ethyl]-N'-(hydroxy-2-ethyl) piperazine with butyl isocyanate. The product was isolated in the form of its dihydrochloride.

(g) N-[(2,4,6-trichlorophenoxy)-2-ethyl]-N'-[β-phenyl-β-(butyl-carbamoyloxy)-ethyl] piperazine (No. 15).— By reaction of N-[(2,4,6-trichlorophenoxy)-2-ethyl]-N'-(β-phenyl-β-hydroxyethyl) piperazine with butyl isocyanate. The product was isolated in the form of its dimaleate.

(h) N-[(ortho - nitrophenoxy) - 2 - ethyl]-N'-[(allyl carbamoyloxy)-2-ethyl] piperazine (No. 16).—By reaction of N-[(ortho-nitrophenoxy) - 2 - ethyl]-N'-(hydroxy-2-ethyl) piperazine with allyl isocyanate. The dimaleate was isolated.

(i) N-[(ortho-nitrophenoxy) - 2 - ethyl]-N'-[(α-naphthyl carbamoyloxy)-2-ethyl] piperazine (No. 17).—By reaction of N-[(ortho-nitrophenoxy) - 2 - ethyl]-N'-(hydroxy-2-ethyl) piperazine with α-naphthyl isocyanate. The dimaleate was recrystallized from absolute alcohol.

(j) N-(phenoxy-2-ethyl)-N'-[(methyl carbamoyloxy)-2-ethyl] piperazine (No. 18).—By reaction of N-(phenoxy - 2 - ethyl)-N'-(hydroxy-2-ethyl) piperazine with methyl isocyanate. The dihydrochloride was recrystallized from absolute alcohol.

(k) N-[(β - naphthoxy)-ethyl]-N'-[(dichloro-3,4-phenyl carbamoyloxy)-2-ethyl] piperazine (No. 19).—By reaction of N-[(β-naphthoxy)-2-ethyl]-N'-(hydroxy-2-ethyl) piperazine with dichloro-3,4-phenyl isocyanate. The product was isolated in the form of its dimaleate.

(l) N-[(para - propionylphenoxy)-2-ethyl]-N'-[(ortho-chlorophenyl carbamoyloxy) - 2 - ethyl] piperazine (No. 20).—By reaction of N-[(para-propionylphenoxy)-2-ethyl]-N'-(hydroxy - 2 - ethyl) piperazine with ortho-chlorophenyl isocyanate. The dimaleate was formed.

(m) N-[(para-propionylphenoxy) - 2 - ethyl]-N'-[(meta-chlorophenyl carbamoyloxy) - 2 - ethyl] piperazine (No. 21).—By reaction of N-[para - propionylphenoxy)-2-ethyl]-N'-(hydroxy - 2 - ethyl) piperazine with meta-chlorophenyl isocyanate. The product was isolated in the form of its dimaleate.

(n) N - [γ - (fluoro-4-benzoyl)-propyl]-N'-[(dichloro-3,4-phenyl carbamoyloxy)-2-ethyl piperazine (No. 22).— By reaction of N-[γ-(fluoro-4-benzoyl)-propyl]-N'-(hydroxy-3-propyl) piperazine with dichloro-3,4-phenyl isocyanate. The dimaleate was recrystallized from absolute alcohol.

(o) N - [(para - fluorophenoxy) - 2-ethyl]-N'-[hexyl carbamoyloxy)-2-ethyl piperazine (No. 23).—By reaction with N - [(para-fluorophenoxy)-2-ethyl]-N'-(hydroxy-2-ethyl) piperazine with hexyl isocyanate. The dimaleate was recrystallized from absolute alcohol.

(p) N - [(para - fluorophenoxy) - 2 - ethyl]-N'-[α-naphthyl carbamoyloxy)-2-ethyl] piperazine (No. 24).— By reaction of N-[(para-fluorophenoxy)-2-ethyl]-N'-(hydroxy-2-ethyl) piperazine with α-naphthyl isocyanate. The dihydrochloride was recrystallized from 95° alcohol.

(q) N - [(ortho - nitrophenoxy)-2-ethyl]-N'-[(para-chlorophenyl carbamoyloxy)-2-ethyl] piperazine (No. 25).—By reaction of N-[(ortho-nitrophenoxy)-2-ethyl]-N' - (hydroxy-2-ethyl) piperazine with para-chlorophenyl isocyanate. The dimaleate was recrystallized from absolute alcohol.

(r) N - (phenoxy - 3 - propyl)-N'-(hexyl carbamoyloxy-2-ethyl) piperazine (No. 26).—By reaction of N-[(phenoxy - 3 - propyl)-N'-(hydroxy-2-ethyl) piperazine and hexyl isocyanate. The dimaleate was recrystallized from absolute alcohol.

TABLE 3

$$R-N\underset{}{\overset{}{\diagup\!\!\!\diagdown}}N-(CH_2)_a-CH-O-Cl-N\diagup^{R_2}_{\diagdown R_3}$$

R₂ (or R₃)=H

| No. | R | R₁ | R₂ or R₃ | n | Yield, percent | Salt | m.p. °F | Calculated C | Calculated H | Calculated N | Found C | Found H | Found N |
|---|---|---|---|---|---|---|---|---|---|---|---|---|---|
| 8 | phenyl-CO-(CH₂)- 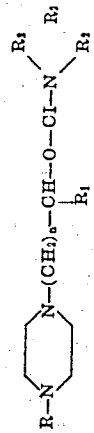 | H | | 1 | 89 | 2HCl | 194 | 52.50 | 7.31 | 8.75 | 52.09 | 7.53 | 8.92 |
| 9 | F-⟨phenyl⟩-O-(CH₂)- | H | -C₄H₉ | 1 | 58 | 2HCl | 172 | 50.60 | 7.03 | 7.65 | 50.68 | 7.65 | 6.99 |
| 10 | F-⟨phenyl⟩-CO-(CH₂)- | H | -C₂H₅ | 1 | 60 | 2C₄H₄O₄ | 177 | 54.25 | 6.03 | 7.03 | 54.79 | 6.07 | 6.99 |
| 11 | Same as above 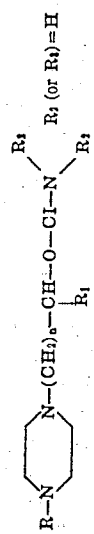 | H | | 1 | 40 | 2HCl | 200 | 56.1 | 7.32 | 8.54 | 55.70 | 7.27 | 8.53 |
| 12 | do | H | -C₂H₅ | 1 | 26 | 2C₄H₄O₄ | 169 | 55.01 | 6.22 | 6.87 | 55.24 | 6.32 | 6.68 |

TABLE 3—Continued

| No. | R | n | R$_1$ | R$_2$ or R$_3$ | Yield, percent | Salt | °F. | Calculated C | Calculated H | Calculated N | Found C | Found H | Found N |
|---|---|---|---|---|---|---|---|---|---|---|---|---|---|
| 13 | F—⟨⟩—O—(CH$_2$)$_2$— | 1 | H | —(CH$_2$)$_2$—CH$_3$ | 27 | 2C$_4$H$_6$O$_4$ | 167 | 54.1 | 6.35 | 7.01 | 54.04 | 6.30 | 7.08 |
| 14 | NO$_2$—⟨⟩—O—(CH$_2$)$_2$— | 1 | H | —(CH$_2$)$_2$—CH$_3$ | 90 | 2HCl | 190 | 48.80 | 6.85 | 11.99 | 48.70 | 6.84 | 12.07 |
| 15 | Cl—⟨⟩—O—(CH$_2$)$_2$— (Cl$_2$) | 1 | ⟨⟩ | —(CH$_2$)$_2$—CH$_3$ | 24 | 2C$_4$H$_6$O$_4$ | 108 | 52.0 | 5.26 | 5.52 | 52.06 | 5.41 | 5.70 |
| 16 | NO$_2$—⟨⟩—O—(CH$_2$)$_2$— | 1 | H | —CH$_2$—CH=CH$_2$ | 72 | 2C$_4$H$_6$O$_4$ | 153 | 51.20 | 5.57 | 9.18 | 51.20 | 5.61 | 9.09 |
| 17 | NO$_2$—⟨⟩—O—(CH$_2$)$_2$— | 1 | H | naphthyl | 40 | 2C$_4$H$_6$O$_4$ | 155 | 56.80 | 5.17 | 8.04 | 56.60 | 5.35 | 8.03 |
| 18 | ⟨⟩—O—(CH$_2$)$_2$— | 1 | H | —CH$_3$ | 67 | 2HCl | 192 | 50.60 | 7.10 | 11.05 | 50.20 | 7.05 | 10.82 |
| 19 | naphthyl—O—(CH$_2$)$_2$— | 1 | H | Cl-phenyl-Cl (Cl$_2$) | 92 | 2C$_4$H$_6$O$_4$ | 197 | 55.0 | 4.80 | 5.84 | 54.75 | 5.07 | 5.88 |
| 20 | CH$_2$—CH$_2$—CO—⟨⟩—O—(CH$_2$)$_2$ | 1 | H | Cl-phenyl-Cl (Cl$_2$) | 46 | 2C$_4$H$_6$O$_4$ | 183 | 55.50 | 5.50 | 6.07 | 55.20 | 5.40 | 6.12 |
| 21 | Same as above | 1 | H | Cl-phenyl-Cl (Cl$_2$) | 20 | 2C$_4$H$_6$O$_4$ | 180 | 55.50 | 5.50 | 6.07 | 55.32 | 5.48 | 5.94 |
| 22 | F—⟨⟩—CO—(CH$_2$)$_2$— | 2 | H | Cl-phenyl-Cl (Cl$_2$) | 30 | 2C$_4$H$_6$O$_4$ | 198 | 52.75 | 4.95 | 5.77 | 52.50 | 5.03 | 5.70 |
| 23 | F—⟨⟩—O—(CH$_2$)$_2$— | 1 | H | —(CH$_2$)$_2$—CH$_3$ | 72 | 2C$_4$H$_6$O$_4$ | 160 | 55.50 | 6.69 | 6.69 | 55.10 | 7.01 | 6.83 |

12

EXAMPLE IV

Dimaleate of N-[γ-(fluoro-4-benzoyl)-propyl]-N'-[(para-nitrophenyl carbamoyloxy)-2-ethyl] piperazine (No. 28)

F—⟨⟩—CO—(CH$_2$)$_3$N⟨N⟩N—
(CH$_2$)$_2$—O—CO—NH—⟨⟩—NO$_2$·2C$_4$H$_4$O$_4$

Into a 250 ml. reaction flask fitted with an agitator, were introduced 11.4 g. (0.0595 mole) of the azide of para-nitrobenzoic acid (obtained by the action of sodium nitrite on the acid chloride) and 70 ml. of anhydrous benzene. The resulting mixture was boiled for 1 hour. Successive additions of 0.7 g. of triethylene diamine and 8.75 g. (0.0297 mole) of N-[γ-(fluoro-4-benzoyl)-propyl]-N'-(hydroxy-2-ethyl) piperazine, added one drop at a time, were made to 50 ml. of anhydrous benzene. The boiling was continued for a further 4 hours.

After cooling, filtering was carried out in order to eliminate a slight excess of para-nitrophenyl isocyanate. The filtrate was left to allow the carbamate to precipitate in the form of a yellow powder (weight obtained 8.6 g.; efficiency 62%).

The base may be converted into its dimaleate by standard methods.

By operating in a similar manner, the following derivatives were obtained (Table IV).

N-[(para-fluorophenoxy)-2-ethyl]-N'-[(para-nitrophenyl carbamoyloxy)-2-ethyl] piperazine (No. 29)

By the action of N-[(para-fluorophenyl)-2-ethyl]-N'-(hydroxy-2-ethyl) piperazine on the azide of para-nitrobenzoic acid. The dihydrochloride was recrystallized from 95° alcohol.

N-[γ-(fluoro-4-benzoyl)-propyl]-N'-[(dimethoxy-3,4-phenyl carbamoyloxy)-2-ethyl] piperazine (No. 30)

By the reaction of N-[γ-(fluoro-4-benzoyl)-propyl]-N'-(hydroxy-2-methyl) piperazine on the azide of dimethoxy-3,4-benzoic acid. The dihydrochloride was recrystallized from a 95° alcohol ether mixture.

N-[γ-(fluoro-4-benzoyl)-propyl]-N'-[para-fluorophenyl carbamoyloxy)-2-ethyl] piperazine (No. 31)

By reaction of N-[γ-(fluoro-4-benzoyl)-propyl]-N'-(hydroxy-2-ethyl) piperazine on the azide of para-fluorobenzoic acid. The dihydrochloride was recrystallized from a 95° alcohol ether mixture.

N-[γ-(fluoro-4-benzoyl)-propyl]-N'-[trimethoxy-3,4,5-phenyl carbamoyloxy)-2-ethyl] piperazine (No. 32)

By reaction of N-[γ-(fluoro-4-benzoyl)-propyl] - N'-(hydroxy-2-ethyl) piperazine on the azide of trimethoxy-3,4,5-benzoic acid. The dimaleate was recrystallized from 95° alcohol.

N-[γ-(2-thienoyl) propyl]-N'-[(trimethoxy-3,4,5-phenyl carbamoyloxy)-2-ethyl] piperazine (No. 33)

By action of N-[γ-(2 thienoyl) propyl]-N'-(hydroxy-2-ethyl) piperazine on the azide of trimethoyl-3,4,5-benzoic acid. The dimaleate was recrystallized from absolute alcohol.

N-[γ-fluoro-4-benzoyl) propyl]-N'-(ortho-fluorophenyl carbamoyloxy)-ethyl piperazine (No. 34)

By the action of N-[γ-(fluoro-4-benzoyl) propyl]-N'-(hydroxy-2-ethyl) piperazine on the azide of ortho-fluorobenzoic acid (obtained by the action of sodium nitrite on the acid chloride). The dimaleate was recrystallized from 95° alcohol.

N-[γ-(fluoro-4-benzoyl) propyl] - N' - (para-trifluoromethyl phenyl carbamoyloxy) - 2 - ethyl] piperazine (No. 35)

By the action of N-[γ-(fluoro-4-benzoyl) propyl]-N'-

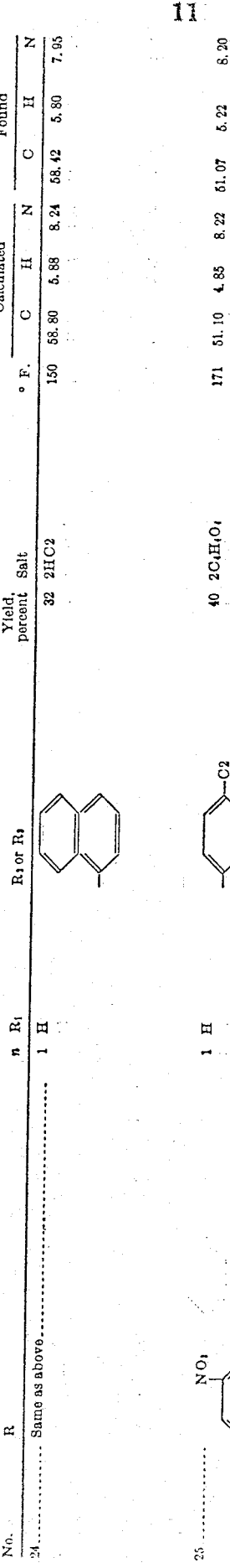

TABLE 3—Continued

| No. | R | R$_1$ or R$_2$ | n | R$_1$ | Yield, percent | Salt | Elementary analysis, percent — Calculated °F. | | | | Found | | |
|---|---|---|---|---|---|---|---|---|---|---|---|---|---|
| | | | | | | | °F. | C | H | N | C | H | N |
| 24 | Same as above | (naphthyl) | 1 | H | 32 | 2HCl | 150 | 58.80 | 5.88 | 8.24 | 58.42 | 5.80 | 7.95 |
| 25 | NO$_2$—⟨⟩—O—(CH$_2$)$_2$— | —⟨⟩—Cl | 1 | H | 40 | 2C$_4$H$_4$O$_4$ | 171 | 51.10 | 4.85 | 8.22 | 51.07 | 5.22 | 8.20 |
| 26 | —O—(CH$_2$)$_2$— | —(CH$_2$)$_2$—CH$_3$ | 1 | H | 65 | 2C$_4$H$_4$O$_4$ | 174 | 57.80 | 7.22 | 6.74 | 57.66 | 7.05 | 6.50 |

(hydroxy-2-ethyl) piperazine on the azide of para-trifluoromethyl benzoic acid (obtained by the action of sodium nitrite on the acid chloride). The dimaleate was recrystallized in absolute alcohol.

N-[(trichloro-2,4,6-phenoxy)-2-ethyl]-N'-(para-nitrophenyl carbamoyloxy)-2-ethyl] piperazine (No. 36)

By the action of N-[(trichloro-2,4,6-phenoxy)-2-ethyl]-N'-(hydroxy-2-ethyl) piperazine on the azide of para-nitrobenzoic acid. The dimaleate was recrystallized from 95° alcohol.

drous benzene was added, in small portions, 0.05 mole (14.7 g.) of N-[γ-fluoro-4-benzoyl)-propyl]-N'-[hydroxy-2-ethyl] piperazine. The mixture was agitated continuously at ordinary temperature for 1 hour. The precipitate was then collected.

By operating in an identical manner the following derivatives, listed together in Table V were obtained.

(a) N-[(ortho - nitrophenoxy)-2-ethyl]-N'-[(para-toluenesulfonyl carbamoyloxy) - 2 - ethyl] piperazine (No. 38).—By the reaction of N-[(ortho-nitrophenoxy)-2-ethyl]-N'-(hydroxy-2-ethyl) piperazine with para-toluene sulfonyl isocyanate. The dimaleate was also formed.

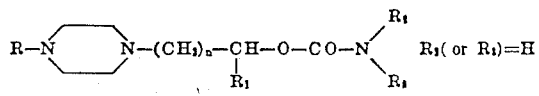

| No. | R | n | $R_1$ | $R_2$ or $R_3$ | Yield, percent | Salt | °F. | Calculated C | H | N | Found C | H | N |
|---|---|---|---|---|---|---|---|---|---|---|---|---|---|
| 27 | F-⟨⟩-CO-(CH₂)₂- | 1 | H | -⟨⟩-NO₂ | 62 | | 156 | 60.20 | 5.89 | 12.20 | 59.98 | 5.75 | 12.51 |
| 28 | Same as above | 1 | H | Same as above | 80 | 2C₄H₄O₄ | 171 | 54.0 | 5.08 | 8.11 | 53.66 | 5.08 | 8.30 |
| 29 | F-⟨⟩-O-(CH₂)₂- | 1 | H | do | 38 | 2HCl | 234 | 49.95 | 5.35 | 11.10 | 49.81 | 5.50 | 11.40 |
| 30 | F-⟨⟩-CO-(CH₂)₂- | 1 | H | OCH₃⟨⟩-OCH₃ | 62 | 2HCl, ½ H₂O | 220 | 54.01 | 6.30 | 7.60 | 54.40 | 6.60 | 7.30 |
| 31 | Same as above | 1 | H | ⟨⟩-F | 80 | 2HCl | 142 | 54.77 | 5.76 | 8.34 | 54.50 | 5.70 | 8.15 |
| 32 | do | 1 | H | OCH₃⟨⟩-OCH₃ OCH₃ | 55 | 2C₄H₄O₄ | 182 | 55.50 | 5.71 | 5.71 | 55.57 | 5.91 | 5.38 |
| 33 | ⟨S⟩-CO-(CH₂)₂- | 1 | H | Same as above | 25 | 2C₄H₄O₄ | 163 | 53.20 | 5.67 | 5.81 | 52.82 | 5.64 | 5.76 |
| 34 | F-⟨⟩-CO-(CH₂)₂- | 1 | H | F⟨⟩ | 65 | 2C₄H₄O₄ | 175 | 56.10 | 5.28 | 6.33 | 56.23 | 5.33 | 6.32 |
| 35 | Same as above | 1 | H | -⟨⟩-CF₃ | 70 | 2C₄H₄O₄ | 178 | 53.80 | 4.91 | 5.89 | 53.77 | 5.06 | 5.54 |
| 36 | Cl-⟨Cl,Cl⟩-O-(CH₂)₂- | 1 | H | -⟨⟩-NO₂ | 45 | 2C₄H₄O₄ | 198 | 46.49 | 4.14 | 7.48 | 46.86 | 4.13 | 7.17 |

EXAMPLE V

N-[γ-(fluoro-4-benzoyl)-propyl]-N'-[(para-toluenesulfonyl carbamoyloxy)-2-ethyl] piperazine (No. 37)

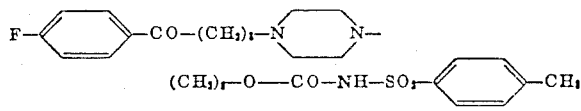

To a cooled and agitated solution of 0.05 mole (9.86 g.) of para-toluenesulfonyl isocyanate in 60 ml. of anhy- (b) N-[γ-(fluoro-4-benzoyl) - propyl]-N'-[(chlorosulfonyl carbamoyloxy)-2-ethyl] piperazine (No. 39).—By the action of N-[γ-(fluoro-4-benzoyl) - propyl]-N'-(hydroxy-2-ethyl) piperazine and chlorosulfonyl isocyanate.

(c) N - [(para - fluorophenoxy - 2-ethyl]-N'-[(β-naphthalene sulfonyl carbamoyloxy)-2-ethyl] piperazine (No. 40).—By the action of N-[(para-fluorophenoxy)-2-ethyl]-N'-(hydroxy-2-ethyl) piperazine and β-naphthalene sulfonyl isocyanate (obtained by reacting naphthalene with chlorosulfonyl isocyanate). The dimaleate crystallized from isopropanol with a molecule of water.

TABLE 5

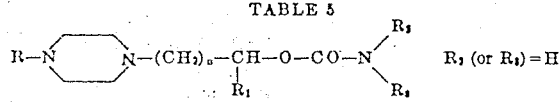

| No. | R | n | $R_1$ | $R_3$ or $R_4$ | Yield, percent | Salt | °F. | Calculated C | Calculated H | Calculated N | Found C | Found H | Found N |
|---|---|---|---|---|---|---|---|---|---|---|---|---|---|
| 37 | F—⟨⟩—CO—$(CH_2)_3$— | 1 | H | $SO_2$—⟨⟩—$CH_3$ | 99 | | 132 | 58.67 | 6.10 | 8.55 | 58.77 | 6.02 | 8.23 |
| 38 | ⟨NO_2⟩—O—$(CH_2)_3$— | 1 | H | $SO_2$—⟨⟩—$CH_3$ | 48 | $2C_4H_4O_4$ | 133 | 49.75 | 4.98 | 7.75 | 49.76 | 5.05 | 7.52 |
| 39 | F—⟨⟩—CO—$(CH_2)_3$— | 1 | H | —$SO_2Cl$ | 50 | | 180 | 46.80 | 5.28 | 9.64 | 47.04 | 5.20 | 9.80 |
| 40 | F—⟨⟩—O—$(CH_2)_3$— | 1 | H | $SO_2$—⟨naphthyl⟩ | 40 | $2C_4H_4O_4, H_2O$ | 130 | 52.70 | 5.60 | 5.59 | 52.79 | 5.16 | 5.47 |

EXAMPLE VI

Trimaleate of N-[(dimethylamino)-2-ethyl]-N'-[(dimethyl carbamoyloxy)-2-ethyl]piperazine (No. 41)

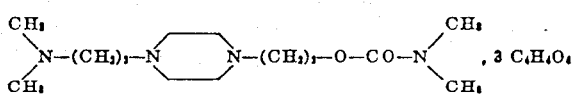

The following mixture was refluxed for 24 hours:

0.05 mole (10.05 g.) of N-[(dimethylamino)-2-ethyl]-N'-(hydroxy-2-ethyl) piperazine,
0.1 mole (10.76 g.) of dimethyl carbamoyl chloride,
0.2 mole (21.2 g.) of anhydrous sodium carbonate, in 400 ml. of dioxan.

The solution was allowed to cool then was filtered to remove mineral salts. The solvent was evaporated under reduced pressure and the desired product was then isolated in the form of its trimaleate which was recrystallized twice from 95° alcohol.

By operating according to these general conditions the following typical compounds were obtained, the physical characteristics of which are given in Table VI.

(a) N - [(dimethylamino) - 2 - ethyl] - N' - [(dimethyl carbamoyloxy)-2-ethyl] piperazine (No. 42).—By reaction of N - [(dimethylamino) - 2 - ethyl]-N'-(hydroxy-2-ethyl) piperazine with diethyl carbamoyl chloride. The trimaleate was recrystallized from 95° alcohol.

(b) N - [γ - (2 thienoyl) propyl] - N' - [(dimethyl carbamoyloxy)-2-ethyl] piperazine (No. 43).—By reaction of N-[γ-(2 thienoyl) propyl]-N'-(hydroxy-2-ethyl) piperazine with dimethyl carbamoyl chloride. The dihydrochloride was recrystallized from absolute alcohol.

(c) N - (β - naphthoxy - 2 - ethyl)-N'-[(dimethyl carbamoyloxy)-2-ethyl] piperazine (No. 44).—By reaction of N-(β-naphthoxy-2-ethyl)-N'-(hydroxy-2-ethyl) piperazine with dimethyl carbamoyl chloride. The dimaleate was recrystallized from 95° alcohol.

(d) N - [γ - fluoro-4-benzoyl)-propyl]-N'-[β-phenyl-β-(dimethyl carbamoyloxy) ethyl] piperazine (No. 45).—By reaction of the N-[γ-fluoro-4-benzoyl)-propyl]-N'-[β-phenyl-β-hydroxy ethyl) piperazine with dimethyl carbamoyl chloride. The dimaleate was recrystallized from absolute alcohol.

TABLE 6

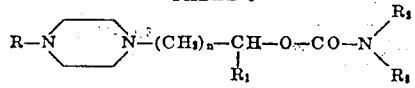

| No. | R | n | $R_1$ | $R_3=R_4$ | Yield, percent | Salt | °F. | Calculated C | Calculated H | Calculated N | Found C | Found H | Found N |
|---|---|---|---|---|---|---|---|---|---|---|---|---|---|
| 41 | $(CH_3)_2N$—$(CH_2)_2$— | 1 | H | $CH_3$ | 43 | $3C_4H_4O_4$ | 182 | 48.40 | 6.45 | 9.04 | 48.80 | 6.67 | 8.83 |
| 42 | Same as above | 1 | H | $C_2H_5$ | 20 | $3C_4H_4O_4$ | 186 | 50.0 | 6.80 | 8.65 | 50.15 | 6.74 | 8.61 |
| 43 | ⟨thienyl⟩—CO—$(CH_2)_3$— | 1 | H | $CH_3$ | 45 | 2HCl | 202 | 47.85 | 6.33 | 9.85 | 47.50 | 6.30 | 9.90 |
| 44 | ⟨naphthyl⟩—O—$(CH_2)_3$— | 1 | H | $CH_3$ | 44 | $2C_4H_4O_4$ | 182 | 57.75 | 6.13 | 6.97 | 58.06 | 6.16 | 6.84 |
| 45 | F—⟨⟩—CO—$(CH_2)_3$— | 1 | ⟨C_6H_5⟩ | $CH_3$ | 16 | $2C_4H_4O_4$ | 160 | 58.80 | 5.94 | 6.23 | 58.98 | 6.09 | 5.89 |

EXAMPLE VII

Dimaleate of N-[γ-(fluoro-4-benzoyl)-propyl]-N'-[(dibenzyl carbamoyloxy)-2-ethyl piperazine (No. 46)

The following mixture was refluxed for a period: 25.35 g. (0.0972 mole) of N-[γ-(fluoro-4-benzoyl)-propyl]-N'-(hydroxy-2-ethyl) piperazine, 12.6 g. (0.0486 mole) of dibenzyl carbamoyl chloride (obtained by the action of phosgene on dibenzylamine in toluene) and 90 ml. of xylene.

After cooling, water was added to the solution in order to dissolve the amino-alcohol hydrochloride. The water was decanted, and the organic phase was separated and dried over $Na_2SO_4$.

After evaporation of the solvent under reduced pressure, a residue was obtained which was converted to the dimaleate in standard fashion.

In similar manner the typical compounds listed in Table VII were prepared.

(a) N - [(para-acetyl phenoxy)-2-ethyl]-N'-[dibenzyl carbamoyloxy)-2-ethyl] piperazine (No. 47).—By reaction of N-[(para-acetyl phenoxy-2-ethyl]-N'-(hydroxy-2-ethyl) piperazine with dibenzyl carbamoyl chloride. The dimaleate was formed.

(b) N - [(dimethylamino) - 2 - ethyl]-N'-[(diphenyl carbamoyloxy) - 2 - ethyl] piperazine (No. 48).—By reaction of the N-[(dimethylamino-2-ethyl]-N'-(hydroxy-2-ethyl) piperazine with diphenyl carbamoyl chloride in toluene. The trimaleate was recrystallized from 95° alcohol.

(c) N-[γ - (fluoro - 4 - benzoyl)-propyl]-N'-[(tetramethylene carbamoyloxy) - 2 - ethyl] piperazine (No. 49).— By reaction of the N-[γ-(fluoro-4-benzoyl)propyl]-N' - (hydroxy-2-ethyl)piperazine with chloroformyl pyrrolidine in toluene (product of the condensation of pyrrolidine and phosgene in toluene). The product was isolated in the form of its dimaleate.

(d) N - [γ - (fluoro - 4 - benzoyl)-propyl] - N' - [(N-cyclohexyl - N - (ethyl carbamoyloxy) - 2 - ethyl] piperazine (No. 50).— By reaction of N-[γ-(fluoro-4-benzoyl)-propyl]-N'-(hydroxy-2-ethyl) piperazine with N-cyclohexyl-N-ethyl carbamoyloxy chloride (product of condensation of N-cyclohexyl-N-ethylamine and phosgene in toluene). The dihydrochloride was recrystallized from an absolute alcohol ether mixture.

(e) N - [γ - (fluoro - 4 - benzoyl)-propyl]-N'-[(diphenyl carbamoyloxy)-2-ethyl] piperazine (No. 31).— By reaction of the N-[γ-(fluoro-4-benzoyl)-propyl]-N'- (hydroxy - 2 - ethyl) piperazine with diphenyl carbamoyl chloride. The dimaleate was recrystallized three times from absolute alcohol.

(f) N - [(para - fluorophenoxy) - 2 - ethyl]-N'-[(tetramethylene carbamoyloxy) - 2 - ethyl] piperazine (No. 52).—By reaction of N-[(para-fluorophenoxy)-2-ethyl]-N' - (hydroxy - 2 - ethyl) piperazine with chloroformyl pyrrolidine. The dimaleate was prepared then recrystallized from absolute alcohol.

TABLE 7

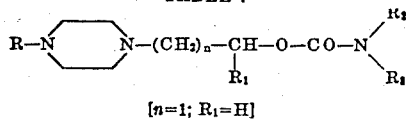

[n=1; $R_1$=H]

| No. | R | $R_2$ | $R_3$ | Yield, percent | Salt | °F. | Calculated C | Calculated H | Calculated N | Found C | Found H | Found N |
|---|---|---|---|---|---|---|---|---|---|---|---|---|
| 46 | F-⟨⟩-CO-(CH₂)₃- | CH₂-⟨⟩ | CH₂-⟨⟩ | 73 | 2C₄H₄O₄ | 152 | 62.50 | 5.88 | 5.61 | 62.33 | 5.99 | 5.63 |
| 47 | CH₃-CO-⟨⟩-O-(CH₂)₂- | Same as above | Same as above | 50 | 2C₄H₄O₄ | 158 | 62.55 | 6.03 | 5.62 | 62.33 | 6.08 | 5.37 |
| 48 | (CH₃)₂N-(CH₂)₂- | -⟨⟩ | -⟨⟩ | 73 | 3C₄H₄O₄ | 170 | 56.50 | 5.92 | 7.53 | 56.79 | 6.10 | 7.22 |
| 49 | F-⟨⟩-CO-(CH₂)₃- | CH₂-CH₂ / CH₂-CH₂ (pyrrolidine) | | 75 | 2C₄H₄O₄ | 170 | 55.82 | 6.10 | 6.75 | 55.86 | 5.88 | 6.53 |
| 50 | Same as above | -⟨⟩ (cyclohexyl) | $C_2H_5$ | 77 | 2HCl | 165 | 57.68 | 7.69 | 8.08 | 57.41 | 7.73 | 7.88 |
| 51 | do | -⟨⟩ | -⟨⟩ | 50 | 2C₄H₄O₄ | 146 | 61.50 | 5.55 | 5.82 | 61.27 | 5.77 | 6.10 |
| 52 | F-⟨⟩-O-(CH₂)₂- | CH₂-CH₂ / CH₂-CH₂ (pyrrolidine) | | 30 | 2C₄H₄O₄ | 180 | 54.35 | 6.03 | 7.04 | 54.44 | 6.07 | 6.81 |

EXAMPLE VIII

The neuroleptic activity of the compounds prepared as described above was investigated by two tests: the first consisted of measuring the motivity of the mouse, the second was based on the potentialization of barbituric narcosis.

(1) Study of motivity

The method used was that described by Dews, P. B., in "J. Pharmacol. 1953, 8, 46–48" and by Boissier, J. R., and Simon, P., in "Arch. Int. Pharmacodyn, 1955, 158, 212."

Isolated mice were placed in cages across which crossed pencils of rays were passed to fall on photoelectric cells.

Actimeters made it possible to count the number of light rays traversed by the animal in 10 minutes.

The medicament to be tested an dthe reference product (chloropromazine: 5 mg./kg.) were administered per os 30 minutes before the test.

The results are shown in Table 8.

TABLE 8.—ACTION ON MOTIVITY

| | Acute toxicity, p.o. mouse, mg./kg. | Percentage of activity sedative | |
|---|---|---|---|
| | | Doses p.o., mg./kg. | Percent activity |
| Compound No.: | | | |
| 7 | 450 | 20 | 25 |
| 9 | 450 { | 10 | 35 |
| | | 50 | 65 |
| 12 | 450 | 10 | 35 |
| 18 | 750 | 10 | 50 |
| 27 | 1,200 { | 25 | 75 |
| | | 10 | 30 |
| 28 | 600 | 25 | 70 |
| 30 | 500 | 5/10 | 25/70 |
| 31 | 400 | 5 | 60 |
| 34 | 400 | 10 | 70 |
| 43 | 750 | 5 | 85 |

Under the same experimental conditions chlorpromazine at 5 mg./kg. p.o. gives 60% activity in relation to the sample.

Examination of these results indicates that derivatives according to the invention numbered 18, 27, 30, 34 and 43 have remarkable sedative properties. In fact motivity of the animals is clearly diminished with doses of less than $\frac{1}{50}$ of the $D_{50}L$.

EXAMPLE IX (2) Test of potentialization of the narcosis

The method of operation was that described by Winter, C. A., "J. Pharmacol. Exp. Ther. 94, 7–11, 1948."

The investigation was to see whether the preliminary administration, by gastric probe, of the experimental product extended the period of sleep induced by injecting mebubarbital.

The results are shown in Table 9.

TABLE 9.—ACTION ON POTENTIALIZATION OF SLEEP

| | Acute toxicity, p.o. mouse, mg./kg. | Percentage of extension of time of sleep | |
|---|---|---|---|
| | | Doses p.o., mg./kg. | Percent |
| Compound No.: | | | |
| 12 | 450 | 20 | 50 |
| 18 | 750 | 20/30 | 75/140 |
| 27 | 1,200 | 10/20 | 26/70 |
| 28 | 600 | 25 | 40 |
| 30 | 500 | 10 | 80 |
| 31 | 400 | 5 | 100 |

Under the same experimental conditions chlorpromazine at 4 mg./kg. per os prolongs the duration of the sleeping time by at least 100%.

Derivatives 18, 27, 30 and 31 potentialize to a very large degree barbiturate narcosis. The doses administered were in fact very small in relation to their general toxicity.

Using the results of these tests (Examples VIII and IX) as a basis it can be stated that the derivatives of the invention numbered 18, 27 and 30 possess remarkable neuroleptic qualities.

EXAMPLE X

Analgesic activity

The Siegmund test was used to prove the analgesic activity. See Siegmund, Cadmus: "Proc. soc. exp. biol. med. 1957, 95, 729." The intra-peritoneal injections of phenylbenzoquinone provokes in the mouse crises whose frequency is diminished by the preventive administration of analgesic. The substances were administered orally 30 minutes before the injection of the algogenic agent.

The animals were observed from the 5th to the 10th minute after injection of phenylbenzoquinone. The percentage of animals protected was calculated. A mouse is considered to be protected if it executes less than 5 stretches in 5 minutes.

The results are given in Table 10.

TABLE 10

| | Acute toxicity, p.o. mouse, mg./kg. | Percentage of protection in relation to samples | |
|---|---|---|---|
| | | Doses p.o. mg./kg. | Percent |
| Compound No.: | | | |
| 9 | 450 | 30 | 50 |
| 10 | 400 | 10 | 80 |
| 12 | 450 | 10 | 70 |
| 18 | 750 | 30/50 | 40/60 |
| 27 | 1,200 | 30 | 80 |
| 28 | 600 | 10/20 | 50/60 |
| 31 | 400 { | 5 | 50 |
| | | 2 | 30 |
| | | 50 | 50 |
| 43 | 750 { | 50 | 80 |
| | | 25 | 50 |

In the same experimental conditions, Pyramidon at a dosage of 40 mg./kg. gives 100% protection in relation to the samples.

Several derivatives of the invention (10, 12, 27, 43) exercise a remarkable analgesic activity at relatively low doses in comparison with the values of the $DL_{50}$.

EXAMPLE XI

The anti-inflammatory activity of the compounds of the invention was investigated using the oedema test with carragenin described by Winter, C. A., Risley, E. A., and colleagues; "Proc. soc. exp. biol. New York, 111, 544 (1962)."

A rat received an injection in the plantar arch of 0.05 mole of a solution with 1% carragenin in physiological serum.

The volume of the front paw was measured immediately and again three hours after the injection of the pholgogenic agent, with the aid of the Apelab plethysmorgraph.

The substance was administered orally one hour before the injection of the carragenin.

The results are given in Table 11.

TABLE 11

Compound No. 28

Acute toxicity, mouse, p.p., mg./kg. _____ 600
Percentage of inhibition in relation to samples:
 Doses p.o. mg./kg _____ 60
 Percent _____ 34

In the same experimental conditions, phenylbutazone— 90 mg./kg. causes 50% inhibition of the experimental oedema.

Derivative No. 28 shows an anti-inflammatory activity whose extent is worth noting.

EXAMPLE XII

The anti-pyretic activity of Compound 43 was investigated by following the procedure laid down by Smith, P. K., and Hambouger, W. J., in "J. Pharmacol. Exp. Ther. 54, 346 (1935)."

A hyperthermia was provoked experimentally in the rat by injecting beer yeast the day before the experiment.

All products were administered, per os, 16 hours after the injection of the pyrogene.

Compound No. 43—$DL_{50}$ close to 750 mg./kg. p.o. possesses at a dosage of 100 mg./kg. an antipyretic activity scarcely less than that obtained by using pyramidon at a dosage of 125 mg./kg. p.o.

EXAMPLE XIII

Action on arterial pressure

Neuroleptic medicaments generally present hypotensive and adrenolytic properties. The same effects were tested for on the blood pressure of the rabbit for the derivatives according to the invention. For this, the method described by Gautrelet, J., in "Eléments Techniques de Physiolgie," Masson Paris, 1932, 225 was used.

The blood pressure was measured utilizing a carotid cannula.

The action per se of the product and its interaction vis-à-vis pharmacological reactants were studied.

The experimental product and the pharmacological reactants were injected into the saphena vein.

Results:

TABLE 12

| Compound No.: | Acute toxicity, mouse p.o., mg./kg. | Percentage of hypotension in relation to acetyl-choline | |
|---|---|---|---|
| | | Doses IV mg./kg. | Percent |
| 8 | 450 | 0.1 | 75 |
| 43 | 750 | 0.2 | 100 |

The compounds mentioned in the above table cause hypotension comparable to that obtained by acetylchlorine at 1 mcg./kg. However, to obtain an effect similar to the sample it was necessary to operate with larger doses.

In addition it may be noted that certain compounds (9, 12, 18, 30) represent, at doses lacking any action per se, adrenolytic activity of some interest which is generally encountered in the family of neuroleptics.

EXAMPLE XIV

Anti-histamine activity

To investigate this activity two tests were used:

protection in connection with bronchospasm involving histamine in the guinea-pig;
inhibition of the effects of the histamine on the ileum of the guinea-pig.

(1) Bronchospasm.—The procedure followed was that described by Halpern, B. N., in "Arch. Int. pharmacodyn. 1942. 68, 339."

Administration of histamine to the guinea-pig (250–300 g.) in the form of an aerosol produced a bronchospasm in a period from 30 to 90 seconds and a coma in 3 or 4 minutes.

Administration of an anti-histamine product 30 minutes before the aerosol delays the appearance of the bronchospasm (period in excess of 5 minutes).

The results are shown in Table 13.

TABLE 13

| Compound No.: | Acute toxicity p.o. mouse, mg./kg. | Percentage of protection | |
|---|---|---|---|
| | | Doses p.o., mg./kg. | Percent |
| 12 | 450 | 20 | 80 |
| | | 40 | 100 |
| 31 | 400 | 20 | 40 |

In the same experimental conditions mepyramine, at a dosage of 20 mg./kg. per os, completely protects guinea-pigs (protection index 100%).

EXAMPLE XV

Anti-histamine activity (2) Isolated ileum of guinea-pig.—The procedure was as described by R. Magnus, Arch. Anat. Physiol. Lps. 1904, 102, 123 and 349.

Principle:

Research into the action per se and antagonism in relation to contracturant effects caused by histamine on the isolated ileum of the guinea-pig, kept alive in a bath of Tyrode liquid at 37° C., aerated and atropined.

Movements were recorded in accordance with Magnus' method.

Results:

Compounds 7, 9 and 18 showed a certain anti-histamine activity but it was necessary to give doses 100 times greater than that of mepyramine to have the same effect.

Conclusion:

Several derivatives of this invention indicate an anti-histamine activity which is far from being insignificant.

These interesting properties of the derivatives of the invention and of their salts make them useful therapeutic medicaments in the treatment of various diseases of the nervous system, such as psychosomatic affective neuroses, manifestations of anxiety in its various forms, insomnia, the treatment of painful syndromes of various origins, in diseases of anti-inflammatory character, and also in certain cases of hypertension.

EXAMPLE XVI

Tablets of the following composition were prepared:
For one tablet:

| | G. |
|---|---|
| Compound No. 27 | 0.025 |
| Kieselguhr | 0.100 |
| Sugar | 0.040 |
| Talcum | 0.015 |
| Magnesium stearate | 0.005 |

Daily dosage is 3 to 4 tablets of the above composition.

EXAMPLE XVII

Therapeutic use may be made of capsules having the following composition:

For one capsule: Compound No. 18, 0.010 g.

Daily dosage is 1 to 6 capsules of the above composition.

EXAMPLE XVIII

Therapeutic application by way of the rectum of suppositories of the following composition:

For one suppository:

| | G. |
|---|---|
| Compound No. 27 | 0.050 |

Excipient—Q.s.p., 3 g.

The suppository is administered at night before retiring.

I claim:

1. A compound of the group consisting of N-[γ-(2-thienoyl)propyl] - N' - [(dimethylcarbamoyloxy)-2-ethyl] piperazine and its acid addition salts.

2. An acid addition salt in accordance with claim 1 wherein the acid is selected from the group consisting of hydrochloric acid and maleic acid.

References Cited

UNITED STATES PATENTS

| 3,189,600 | 6/1965 | Huebner | 260—268 FT |
| 2,836,595 | 5/1958 | Parcell | 260—268 PH |
| 2,979,507 | 4/1961 | Janssen | 260—268 FT |
| 2,985,657 | 5/1961 | Janssen | 260—268 FT |
| 3,138,597 | 6/1964 | Schut | 260—268 PH |
| 3,719,680 | 3/1973 | Abbate | 260—268 PH |

DONALD G. DAUS, Primary Examiner

U.S. Cl. X.R.

260—247.2 B, 268 R, 268 H, 268 BC; 424—248, 250

UNITED STATES PATENT OFFICE
CERTIFICATE OF CORRECTION

Patent No. 3,810,897    Dated May 14, 1974

Inventor(x) Jean B. Philippe

It is certified that error appears in the above-identified patent and that said Letters Patent are hereby corrected as shown below:

Column 1, in the formula at the third line from the bottom, "R" should be --$R_7$--;
Column 3, lines 37-8, "halophenyl" should be --halogenophenyl--;
Column 5, line 26, "$\gamma$-fluoro" should be -- $\gamma$ - (fluoro--;
Column 5, line 41, "N-[dimethylamino" should be --N-[(dimethylamino--;
Column 7, line 44, "N-[para" should be --N-[(para--;
Column 8, in the heading over Table 3,

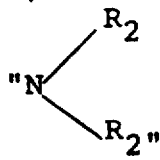

should be --

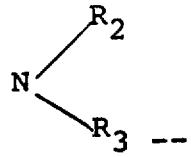

--

Column 9, under the heading "N" in Item 13, ".7.01" should be --7.01--;
Column 12, line 71, "N'-(para" should be --N'-[(para--;
Column 13, line 5, "N'-(para" should be --N'-[(para--;
Column 18, line 19, "No. 31" should be --No. 51--;
Column 19, line 16, "an dthe" should be --and the--;
Column 19, line 44, "$D_{50}L$" should be --DL 50--;
Column 19, line 66, "chlorpromazine" should be --chloropromazine--
Column 20, line 50, "pholgogenic" should be --phlogogenic--;
Column 20, line 51, "Apelab plethysmorgraph" should be --APELAB plethysmograph--;
Column 20, line 59, "p.p." should be --po--.

Signed and sealed this 1st day of October 1974.

(SEAL)
Attest:

McCOY M. GIBSON JR.
Attesting Officer

C. MARSHALL DANN
Commissioner of Patents